United States Patent [19]

Song et al.

[11] Patent Number: 5,500,813

[45] Date of Patent: Mar. 19, 1996

[54] CIRCUIT FOR ADDING MULTIPLE-BIT BINARY NUMBERS

[75] Inventors: Sang-won Song, Seoul; Chan-sik Kim, Bucheon, both of Rep. of Korea

[73] Assignee: Samsung Electronics Co., Ltd., Suwon, Rep. of Korea

[21] Appl. No.: 63,785

[22] Filed: May 20, 1993

[30] Foreign Application Priority Data

May 20, 1992 [KR]  Rep. of Korea .................. 92-8571

[51] Int. Cl.$^6$ ................................................ G06F 7/50
[52] U.S. Cl. ................................................ 364/787
[58] Field of Search .................. 364/787, 786, 364/784

[56] References Cited

U.S. PATENT DOCUMENTS

| 5,095,458 | 3/1992 | Lynch et al. | 364/787 |
| 5,122,982 | 6/1992 | Cohn | 364/787 |
| 5,166,899 | 11/1992 | Lamb | 364/787 |
| 5,278,783 | 1/1994 | Edmondson | 364/787 |

*Primary Examiner*—Tan V. Mai
*Attorney, Agent, or Firm*—Cushman Darby & Cushman

[57] ABSTRACT

An adder includes carry generation & propagation circuits, a carry evaluation circuit and a final sum circuit, wherein the carry generation & propagation circuit and the sum circuit are composed of transmission gates, and the operation can be carried out having a reduced number of stages, thereby decreasing layout area and increasing speed.

7 Claims, 8 Drawing Sheets

CIRCUIT FOR ADDING MULTIPLE-BIT BINARY NUMBERS

BACKGROUND OF THE INVENTION

The present invention relates to an adder, and more particularly to a parallel adder.

A high-speed parallel adder is frequently used within a high-speed digital signal processor. However, since increased speed requires greater chip area faster speeds result in such disadvantages as a complicated layout and increased chip area.

A known algorithm for binary addition, expressed in terms of Boolean algebra, is as follows.

$$C_i = G_i + P_i \cdot G_{i-1}$$

$$P_i = A_i + B_i$$

$$G_i = A_i \cdot B_i$$

$$S_i = G_{i-1} + P_i$$

where $C_i$ is the carry signal from a bit position i, $P_i$ is a block carry propagating signal, $G_i$ is a block carry generating signal, $S_i$ is a final output, A is an addend, and B is an augend.

A new operator "o" having the following function may be defined as: $(g, p) \circ (g', p') = (g+(p \circ g'), p \cdot p')$ where g, p, g' and p' are Boolean variables. The new operator is associative, and a carry signal is determined by $C_i = G_i$. Here, $(G_i, P_i) = (g_i, p_i)$ if i=1 and $(gi,pi) \circ (g_{i-1}, P_{i-1}) = (g_i, P_i) \circ (g_{i-1}, P_{i-1}) \ldots \circ \ldots (g_1, p_1)$ if $2 \leq i \leq n$.

The associative characteristic of operator "o" is formed of elements $(G_i, P_i)$ having a binary tree structure with a path length of (log n).

FIG. 1 illustrates a block diagram of general adder for performing the above-described algorithm including the logic gates needed for each block operation.

The circuit shown in FIG. 1 includes a carry generation & propagation block 1, a carry evaluation block 2 for evaluating the carry by inputting signals from carry generation & propagation block 1, and a sum block 3 for inputting signals from carry evaluation block 2 to thereby output a final sum.

Carry generation & propagation block 1 is composed of AND gates $4_n$–$4_1$ for inputting two numbers $A_i$ and $B_i$ (where i=1, 2, 3 . . . , n) to generate the carry, and XOR gates $5_n$–$5_1$ for inputting two numbers $A_i$ and $B_i$ (where i=1, 2, 3 . . . , n) to propagate the carry.

Sum block 3 is composed of XOR gates $6_n$–$6_1$, each of which input the carry generating signal $P_i$ (where i=1, 2, 3 . . . , n) and output signal $C_i$ (where i=1, 2, 3 . . . , n) of carry evaluation block 2, to thereby output the result of the summation.

FIG. 2 illustrates a tree structure of the carry evaluating block shown in FIG. 1.

In FIG. 2, a solid dot designates an operation whereby two input signals ($gin_{i-1}$, $pin_{i-1}$) and ($gin_i$, $pin_i$) are input to thereby generate:

$$gout = gin_{i-1} \vee (pin_{i-1} \wedge gin_i)$$

and $$pout = pin_{i-1} \wedge pin_i \quad (1)$$

Also, a small circle designates an operation whereby two input signals gin and pin are input to generate:

$$gout = gin$$

and $$pout = pin \quad (2)$$

That is, in the case of the 16-bit adder shown in FIG. 2, the computation is carried out through eight stages.

The tree structure shown in FIG. 2 will be described below.

In a first stage (T=0), the operation of equation (2) is performed by inputting the carry generating and propagating signals ($g_i$, $p_i$ where i=1, 2, 3 . . . , n) by means of sixteen operations, each represented by the small circles.

In a second stage (T=1), the operation of equation (1) is performed by inputting respective odd output signals ($g_i$, $p_i$ where i=1, 3, 5 . . . , 15) and even output signals $g_i$ and $p_i$ (where i=2, 4, 6 . . . , 16) while also allowing the odd output signals to be passed intact.

In a third stage (T=2), the operation of equation (1) is performed by inputting respective output signals of the even solid dots from the second stage (T=1) and the immediatelly lower odd solid dot from the second stage (T=1), while also allowing the odd output signals and the output signals of the odd solid dots of the second stage (T=1) to be passed intact.

In a fourth stage (T=3), the operation of equation (1) is performed by inputting the output signals of the solid dot in third stage (T=2) by twos, while also allowing the output signals of the small circles and the odd solid dots in third stage (T=2) to be passed intact.

In a fifth stage (T=4). the operation of equation (1) is performed by inputting the output signals of the two solid dots in fourth stage (T=3), while allowing the output signals of the small circle and the odd solid dot in the fourth stage (T=3) to be passed intact.

In a sixth stage (T=S), the operation of equation (1) is performed by inputting the eighth and twelfth output signals of the small circle in fifth stage (T=4), while allowing all output signals other than the twelfth output signal (both solid dots and small circles) of the fifth stage to pass intact.

In a seventh stage (T=6), the operation of equation (1) is performed by inputting the fourth and sixth output signals, eighth and tenth output signals, and twelfth and fourteenth output signals in sixth stage (T=S), while allowing the output signals other than the sixth, tenth and fourteenth output signals to pass intact.

In an eighth stage (T=7), the operation of equation (1) is performed by inputting the second & third, fourth & fifth, sixth & seventh, eighth & ninth, tenth & eleventh, twelfth & thirteenth, and fourteenth & fifteenth output signals in seventh stage (T=6), and the remaining even output signals and first output signal are passed intact. By performing the above-described operations, a final result $C_i$ (where i=1, 2, 3 . . . , 16) is output.

As is apparent, the conventional parallel adder has a slow operating speed and requires complicated circuitry.

SUMMARY OF THE INVENTION

It is the object of the present invention to provide a parallel adder capable of improving speed and decreasing chip area.

In order to achieve the above object of the present invention, there is provided an adder comprising carry generation & propagation circuits, a carry evaluation circuit and a final sum circuit, wherein the carry generation & propagation circuits and sum circuit are composed of transmission gates, and the addition operation can be carried out by only five stages.

More specifically, the adder according to the present invention comprises:

carry generation & propagation circuits for inputting two 16-bit data signals to output carry generating & propagating signals;

1st-first cells for respectively inputting 3rd & 4th, 5th & 6th, 7th & 8th, 9th & 10th, 11th & 12th, 13th & 14th and 15th & 16th output signals from the carry generation & propagation circuits to perform an operation;

a 1st-second cell for inputting 1st and 2nd output signals of the carry generation & propagation circuits to perform an operation;

2nd-second cells for respectively inputting an output signal of the 1st-second cell, a 3rd output signal of the carry generation & propagation circuits, and a 1st output signal of the 1st-first cells to perform an operation;

2nd-first cells for respectively inputting a 2nd output signal of the 1st first cells, a 7th output signal of the carry generation & propagation circuits and a 3rd output signals of the 1st-first cells, respectively inputting a 4th output signal of the 1st-first cells, an 11th output signal of the carry generation & propagation circuits and a 5th output signal of the 1st-first cells, and respectively inputting a 6th output signal of the 1st-first cells, a 15th output signal of the carry generation & propagation circuits and a 7th output signal of the 1st-first cells, to perform respective operations;

3rd-first cells for respectively inputting a 2nd output signal of the 2nd-second cells, a 5th output signal of the carry generation & propagation circuits, a 2nd output signal of the 1st-first cells, 1st & 2nd output signals of the 2nd-first cells, and respectively inputting a 4th output signal of the 2nd-first cells, a 13th output signal of the carry generation & propagation circuits, a 6th output signal of the 1st-first cells and a 5th output signal of the 2nd-first cells, to perform respective operations;

3rd-second cells for respectively inputting a 2nd output signal of the 2nd-second cells, a 5th output signal of the carry generation & propagation circuits, a 2nd output signal of the 1st-first cells, and a 1st output signal of the 2nd-first cells, to perform an operation;

a third cell for inputting 1st, 2nd, 4th and 6th output signals of the 2nd-first cells and a 2nd output signal of the 2nd-second cells, to perform an operation;

4th-second cells for respectively inputting a 4th output signal of the 3rd-second cells, a 9th output signal of the carry generation & propagation circuits, a 4th output signal of the 1st-first cells, 3rd and 4th output signals of the 2nd-first cells, and 1st, 2nd and 3rd output signals of the 3rd-first cells; and final sum circuits for respectively inputting the output signals from the carry generation & propagation circuits and first, second and third cells to output a final sum.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

An adder according to the present invention will be described below.

The algorithm of the binary addition according to the present invention is as follows.

When an operand "o" is defined as:

$(g,p)$ o $(g',p')=(g \vee (p \wedge g'), p \wedge p')$ where g, g', p' and p represent Boolean variables, it can be understood that, using the distributivity properties of an AND-operation ($\wedge$) and an OR-operation ($\vee$), the following is true: $[(g_3,P_3)$ o $(g_2,P_2)]$ o $(g_1,P_1)=(g_3,P_3)$ o $[(g_2,P_2)$ o $(g_1, P_1)]$ Therefore, when block carry generating signal $G_i$ and block carry propagating signal $P_i$ are computed, the order of computing the right-hand side of the following expression does not affect the values of $G_i$ and $P_i$: $(G_i,P_i)=[(g_i,P_i)$ o $(g_{i-1},P_{i-1})]$ o ... o $(g_1,P_1)$ The present invention is to perform the above algorithm.

Figure 3:
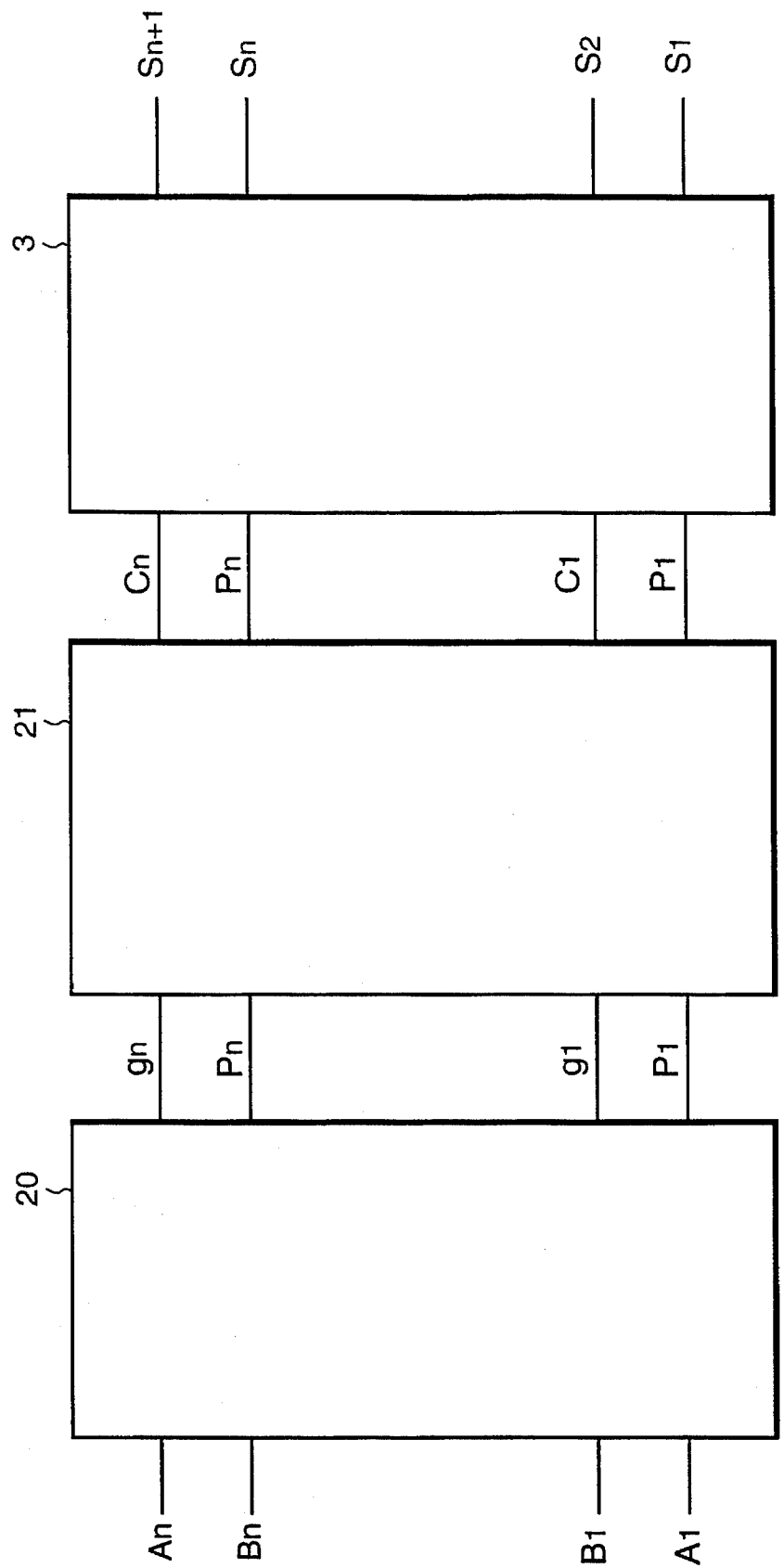
FIG. 3 is a block diagram showing an n-bit parallel adder according to the present invention.

FIG. 3 illustrates a structure of a parallel adder according to the present invention.

Figure 1:
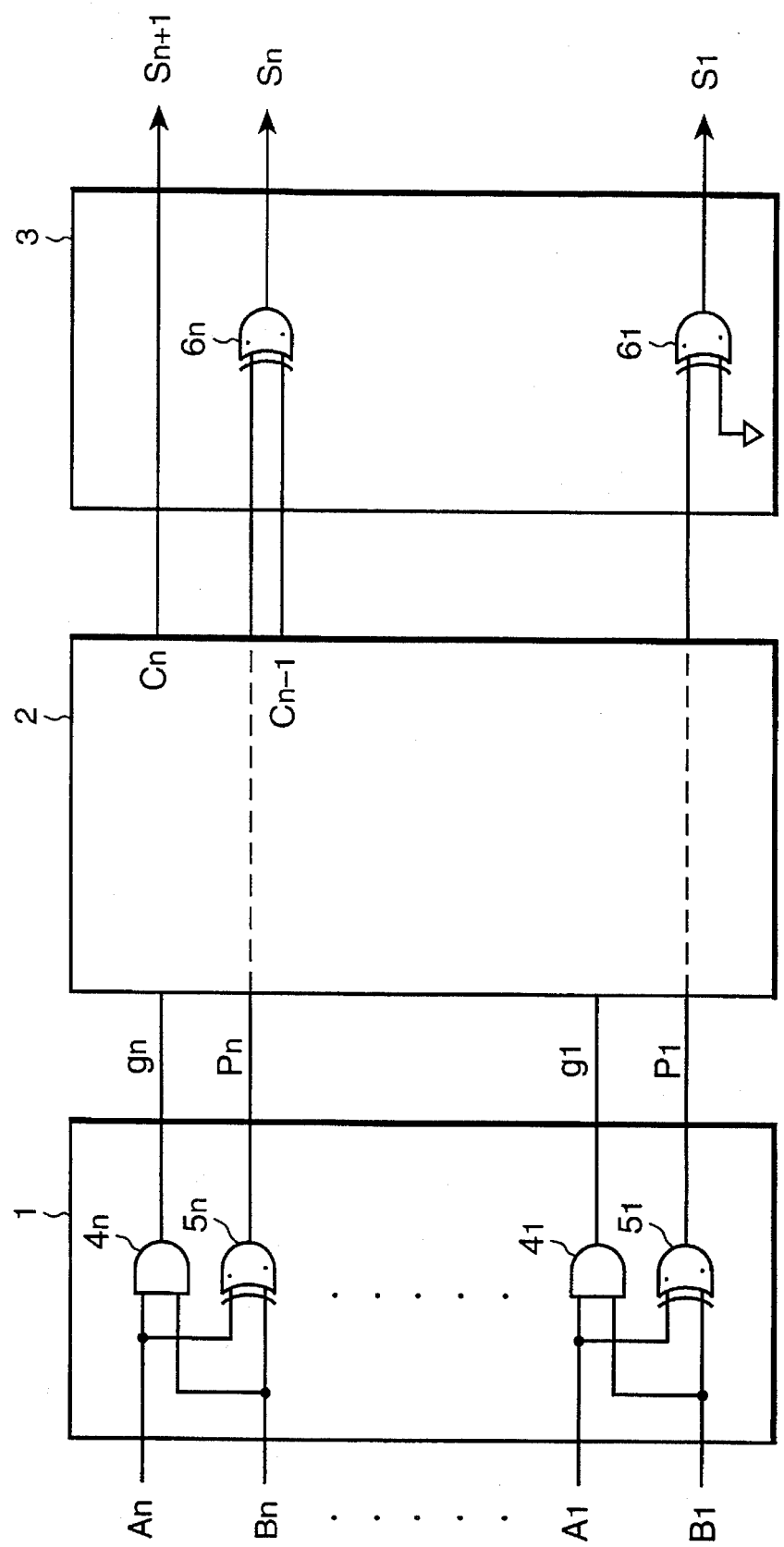
FIG. 1 is a block diagram showing a conventional n-bit parallel adder.
Figure 2:
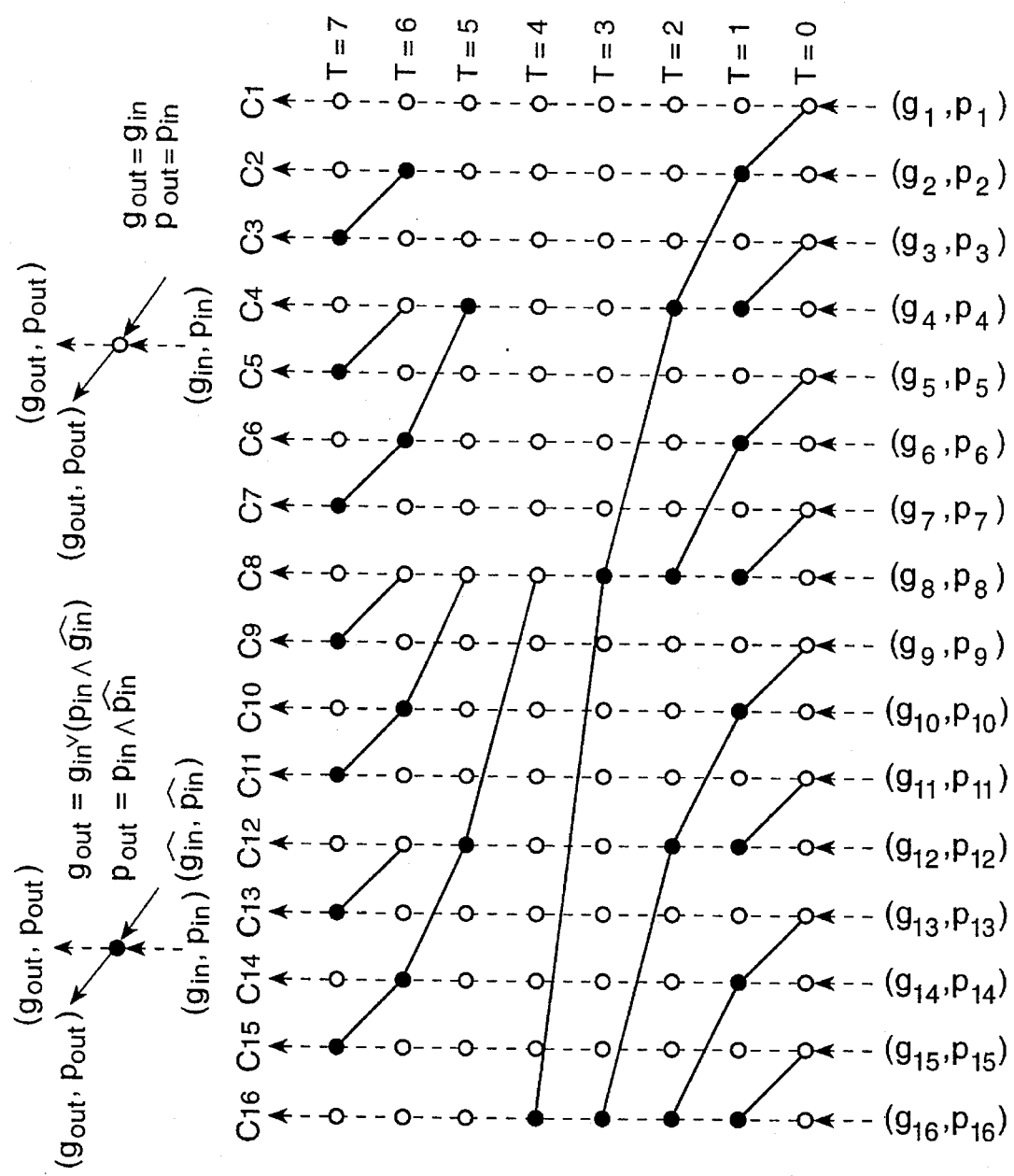
FIG. 2 shows a tree structure of a conventional 16-bit carry evaluation block.

The blocks shown in FIG. 3 perform the same functions as those shown in FIG. 1, which are a carry generation & propagation block 20, a carry evaluation block 21 and a sum block 22 for computing a final sum.

Figure 4:
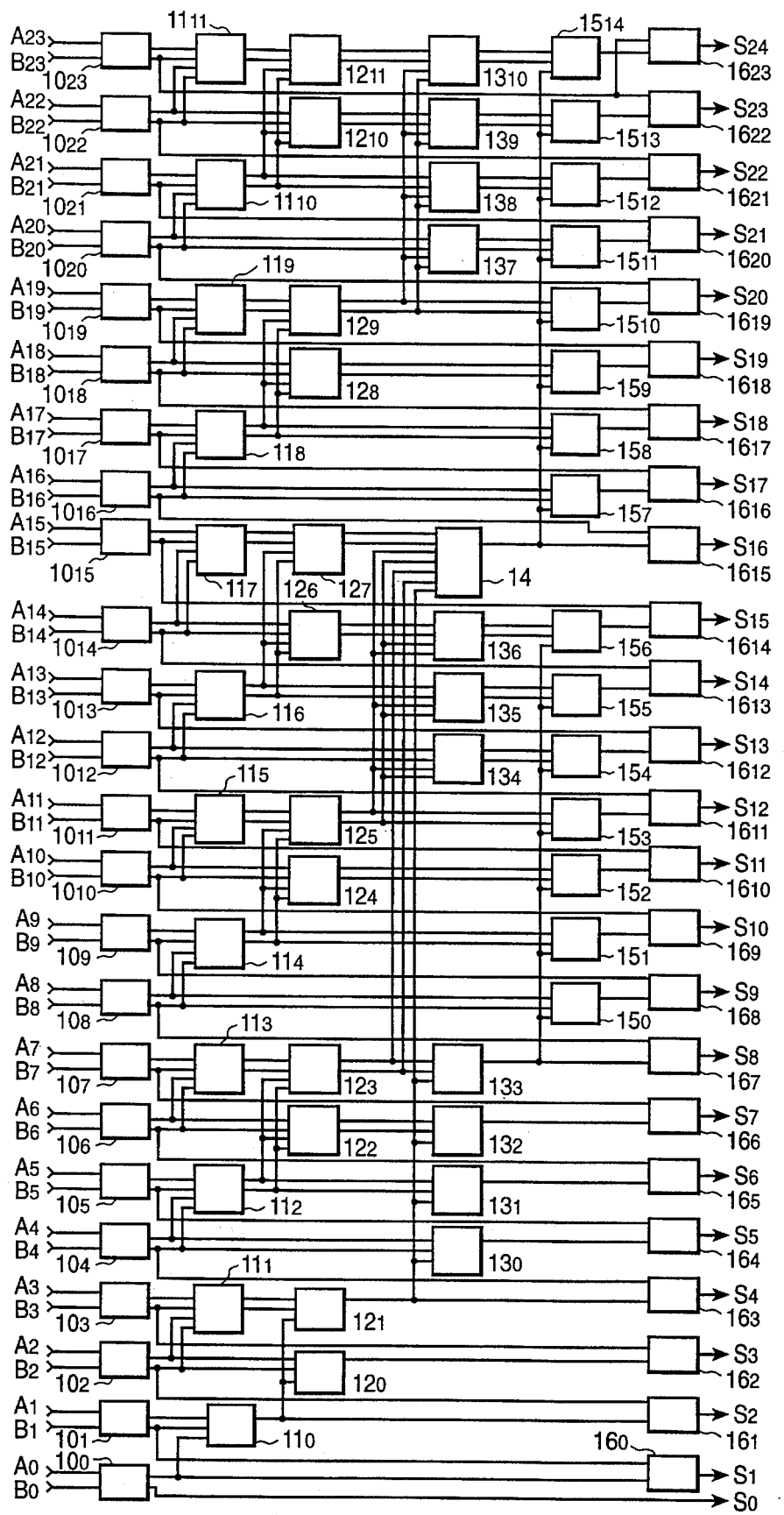
FIG. 4 is a block diagram of one embodiment showing a 24-bit parallel 20 adder according to the present invention.

FIG. 4 is a block diagram showing a circuit specifically embodying the block diagram shown in FIG. 3.

In FIG. 4, the circuit includes: carry generation & propagation circuits $10_{23}$~$10_0$ for inputting two 24-bit numbers ($A_{23}$~$A_0$, $B_{23}$~$B_0$), and outputting a 24-bit carry generating signal $g_i$ (where i=0, 1, 2 ..., 23) and carry propagating signal pi (where i=0, 1, 2 ..., 23); first cell blocks $11_{11}$~$11_1$, $12_{11}$~$12_2$ and $13_6$~$13_4$ for inputting carry generating & propagating signals $(gin_1,pin_1)$ and $(gin_2,pin_2)$ to implement the operations of gout= $gin_1 \vee (pin_1 \wedge gin_2)$ and pout= $pin_1 \wedge pin_2$; second cell blocks $11_0$, $12_1$, $12_0$, $13_3$~$13_0$, $13_{10}$~$13_7$ and $15_{14}$~$15_0$ for inputting carry generating & propagating signals $(gin_1, pin_1)$ and $(gin_2, pin_2)$ to implement the operation of gout=$gin_1 \vee (pin_1 \wedge pin_2)$; a third cell block 14 for inputting carry generating & propagating signals $(g_i,P_i)$, $(g_{i-1},P_{i-1})$, $(g_{i-2},P_{i-2})$ and $(g_{i-3}, P_{i-3})$, to implement the operation of gout= $g_i \lor (p_i \land g_{i-1}) \lor (p_i \land p_{i-1} \land p_{i-2}) \lor (p_i \land p_{i-1} \land p_{i-2} \land g_{i-3})$; and final adders $16_{23}$~$16_0$ for inputting carry generating & propagating signal ($g_i$, $p_i$), and outputting a final sum.

The operation according to the above construction will be described.

In a first stage, carry generation & propagation circuits $10_{23}$~$10_0$ generate carry generating signal $g_i$ (where i=23, 22, 21 . . . , 0) and carry propagating signal $p_i$ (where i=23, 22, 21 . . . , 0).

In a second stage, second cell block $11_0$ receives first three output signals $g_1$, $P_1$ and $g_0$ from the carry generation & propagation circuits $10_0$ and $10_1$ to thereby perform an operation, and first cell blocks $11_1$~$11_{11}$ perform an operation by receiving output signals (gi, pi where i=2, 3, 4 . . . , 23) from the carry generation & propagation circuits by two pairs.

In a third stage, second cell block $12_0$ performs an operation by receiving the output signals from second cell block $11_0$ and carry generation & propagation circuit $10_2$. Second cell block $12_1$ performs an operation by receiving the output signals from first cell block $11_1$ and second cell block $11_0$. First cell blocks $12_3$, $12_5$, $12_7$, $12_9$ and $12_{11}$ perform an operation respectively by receiving the output signals from first cell blocks $11_2$~$11_{11}$, in pairs. Also, first cell blocks $12_2$, $12_4$, $12_6$, $12_8$ and $12_{10}$ respectively perform an operation by receiving the output signals of first blocks $11_2$, $11_4$, $11_6$, $11_8$ and $11_{10}$ and the output signals of carry generation & propagation circuits $10_6$, $10_{10}$, $10_{14}$, $10_{18}$ and $10_{22}$.

In a fourth stage, second cell blocks $13_0$~$13_3$ respectively perform an operation by each receiving the output signals of second cell block $12_1$, and respectively receiving output signals from carry generation & propagation circuit $10_4$, first cell block $11_2$ and first cell blocks $12_2$ and $12_3$. First cell blocks $13_7$~$13_{10}$ perform an operation by each receiving the output signals of first cell block $12_9$, and respectively receiving output signals from carry generation & propagation circuit $10_{20}$ and first cell blocks $11_{10}$, $12_{10}$ and $12_{11}$. First, cell blocks $13_4$, $13_5$ and $13_6$ perform an operation by each receiving output signals of first cell block $12_5$, and respectively receiving output signals from carry generation & propagation circuit $10_{12}$, and first cell blocks $11_6$ and $12_6$. Also, third cell block $14$ performs an operation by receiving respective outputs of second cell block $12_1$ and first cell blocks $12_3$, $12_5$ and $12_7$.

In a fifth stage, second cell blocks $15_0$~$15_6$ perform an operation by each receiving output signals of second cell block $13_3$ and respectively receiving output signals from carry generation & propagation circuit $10_8$ and first cell blocks $11_4$, $12_4$, $12_5$, $13_4$, $13_5$ and $13_6$. Second cell blocks $15_7$~$15_{14}$ perform an operation by each receiving the ouput signal from third cell block $14$ and respectively receiving output signals of carry generation & propagation circuit $10_{16}$, and first cell blocks $11_6$, $12_8$, $12_9$ and $13_7$~$13_{10}$.

In a sixth stage, sum circuit $16_0$ generates a sum signal $S_1$ by receiving the output signals of carry generation from circuit $10_0$ and carry propagation from circuit $10_1$. Sum circuit $16_1$ generates a sum signal S2 by receiving the output signals of second cell block $11_0$ and carry propagation from circuit $10_2$. Sum circuit $16_2$ outputs a sum signal S3 by receiving the output signals of carry propagation from circuit $10_3$ and second cell block $12_0$. Sum circuit $16_3$ outputs a sum signal $S_4$ by receiving the output signals of carry propagation from circuit $10_4$ and second cell block $12_1$. Sum circuits $16_4$~$16_7$ respectively output sum signals $S_5$~$S_8$ by receiving the output signals of carry propagation from circuits $10_5$~$10_8$ and second cell blocks $13_0$~$13_3$. Sum circuits $16_8$~$16_{14}$ respectively output sum signals $S_9$~$S_{15}$ by receiving the output signals of carry propagation from circuits $10_9$~$10_{15}$ and second cell blocks $15_0$~$15_8$. Sum circuit $16_{15}$ outputs a sum $S_{16}$ by receiving the output signals of carry propagation from circuit $10_{16}$ and third cell block $14$. Sum circuits $16_{17}$~$16_{22}$ respectively output sum signals $S_{22}$~$S_{17}$ by receiving the output signals of carry propagation from circuits $10_{23}$~$10_{17}$ and second cell blocks $15_{13}$~$15_7$. Sum circuit $16_{23}$ outputs a sum signal $S_{24}$ by receiving the output signals of carry generation & propagation circuit $10_{23}$ and second cell block $15_{14}$.

It should be noted that, if overflow occurs in two's complement arithmetic, an accurate result cannot be obtained. The methods for solving the problem can be classified into one of two types. In the sign extension method an operation is carried out by extending sign bits in advance and a last carry bit signal is discarded. In the signal propagation method, after performing an operation, overflow is corrected once it occurrs. The sign propagation method has a drawback of slower speed than the sign extension method since the result of the arithmetic is corrected anew. In utilizing the sign extension method, a general adder requires an (n+1)-bit operator due to one-bit extension but, in the present invention, only a sum circuit $16_{23}$ is added to an n-bit adder when using the sign extension method. Therefore, the present invention is advantageous in view of speed and chip area. Consequently, if addend A and augend B are normal binary numbers, the output signals of carry propagation signal generators $15$ and $14$ become the most significant bits of the sum. Meanwhile, if the addend and augend are the two's complement, the output signal of sum circuit $16_{23}$ becomes the most significant bit of the sum.

Figure 5E:
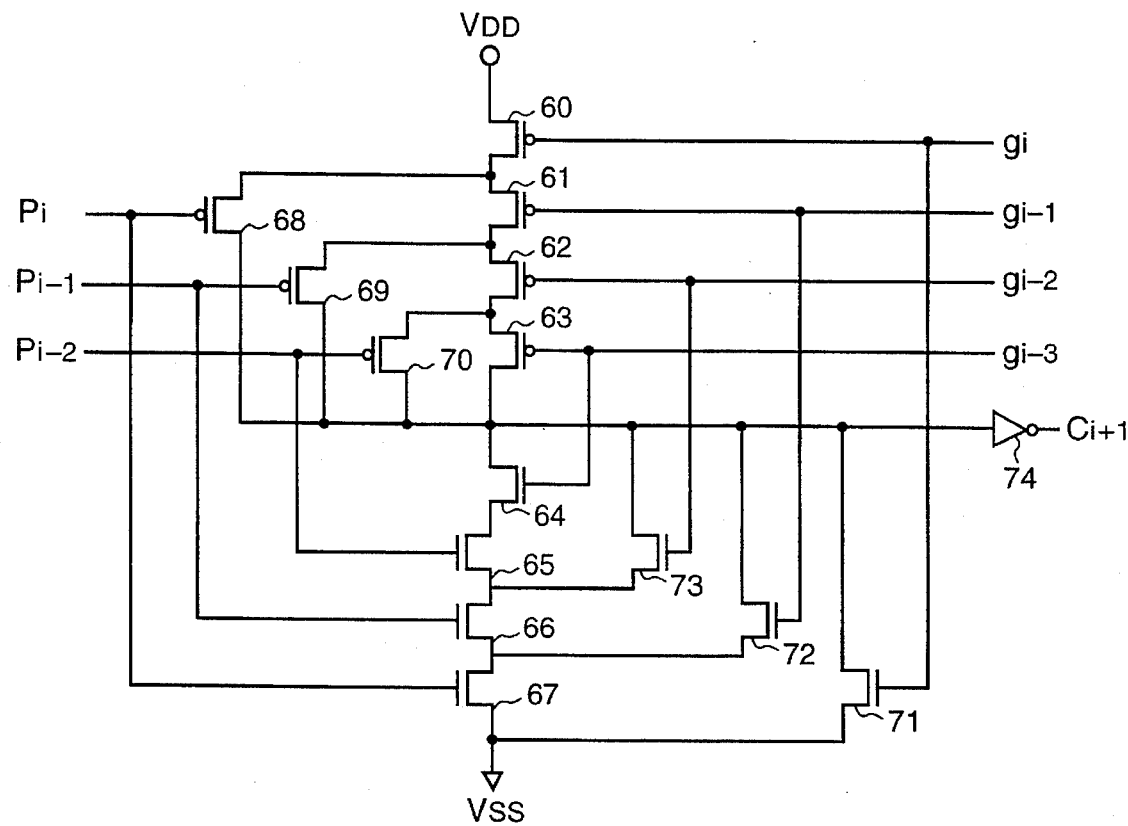
FIG. 5E is a circuit diagram of an embodiment showing a third cell according to the present invention.
Figure 5F:
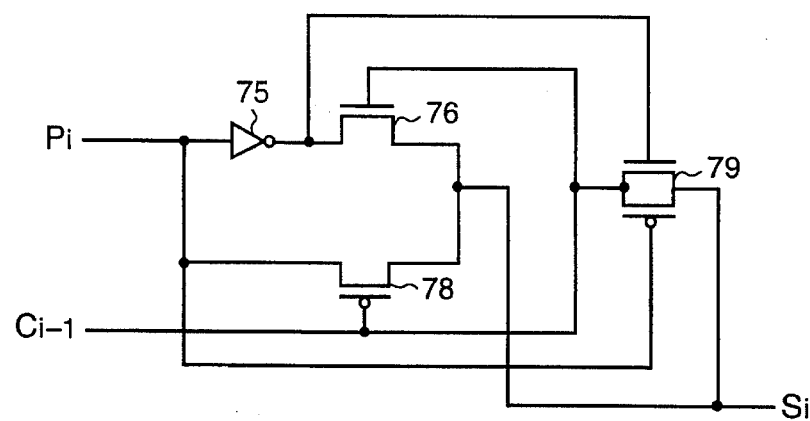
FIG. 5F is a circuit diagram of an embodiment showing a fourth cell according to the present invention.
Figure 5B:
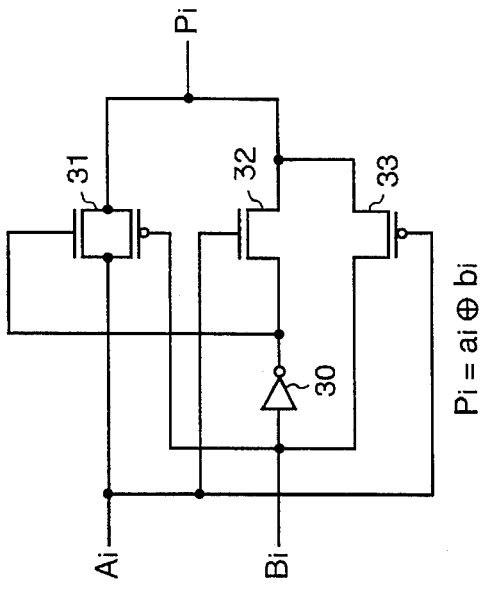
FIG. 5B is a circuit diagram of an embodiment showing a carry propagation circuit according to the present invention.
Figure 5D:
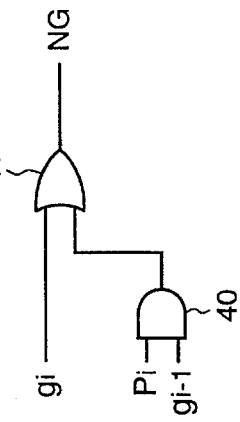
FIG. 5D is a logic circuit diagram of an embodiment showing a second cell according to the present invention.
Figure 5A:
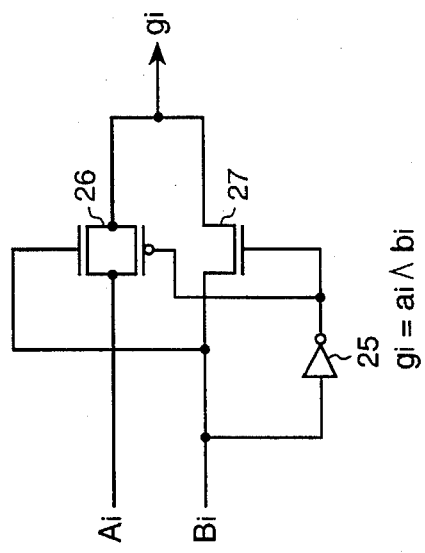
FIG. 5A is a circuit diagram of an embodiment showing a carry generation circuit according to the present invention.

FIG. 5A illustrates the carry generation circuit of the carry generation & propagation block shown in FIG. 4.

In FIG. 5A, the carry generation circuit includes an inverter $25$ for inverting input signal $B_i$, a CMOS transmission gate $26$ for propagating input signal $A_i$ in response to input signal $B_i$ and an inverted input signal, and an NMOS transmission gate $27$ for propagating input signal $B_i$ in response to the inverted input signal. Thus, when both input signals $A_i$ and $B_i$ are at logic "high" levels, a "high" logic signal is output.

FIG. 5B illustrates the carry propagation circuit of the carry generation & propagation block shown in FIG. 4.

In FIG. 5B, the carry propagation circuit includes an inverter $30$ for inverting input signal $B_i$, a CMOS transmission gate $31$ for propagating input signal $A_i$ in response to input signal $B_i$ and an inverted input signal, an NMOS transmission gate $32$ for propagating the inverted input signal in response to input signal $A_i$, and a PMOS transmission gate $33$ for propagating input signal $B_i$ in response to input signal $A_i$. Thus, when the signal levels of input signals $A_i$ and $B_i$ differ from each other, a "high" logic signal is output. In other words, an EXOR operation is executed.

Figure 5C:
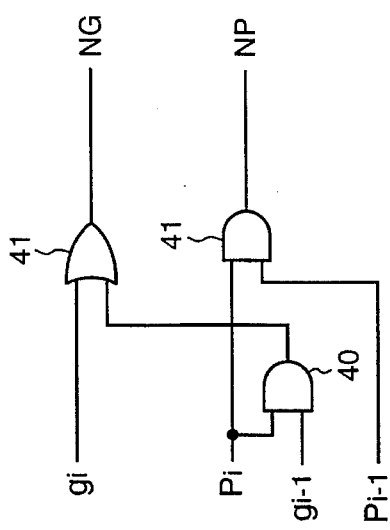
FIG. 5C is a logic circuit diagram of an embodiment showing a first cell according to the present invention.

FIG. 5C illustrates the first cell circuit of the carry evaluation block shown in FIG. 4.

In FIG. 5C, the first cell circuit includes an AND gate $40$ for performing a logical product of carry propagating signal pj and carry generating signal $g_{i-1}$, an OR gate $41$ for performing logical sum of carry generating signal $g_i$ and the output signal of AND gate $40$, and an AND gate $42$ for performing logical product of carry propagating signals $p_i$ and $P_{-1}$. That is, output signals NG and NP implement the following logical expressions:

$$NG = g_i + (p_i \cdot g_{i-1})$$

and $$NP = p_i \cdot p_{i-1}$$

FIG. 5D illustrates the second cell circuit of the carry evaluation block shown in FIG. 4.

In FIG. 5D, the second cell circuit includes an AND gate 50 and an OR gate 51 for allowing output signal NG to be generated from the circuit shown in FIG. 5C.

FIG. 5E illustrates the third cell circuit of the carry evaluation block shown in FIG. 4.

In FIG. 5E, the third cell circuit includes: four PMOS transistors 60, 61, 62 and 63 and four NMOS transistors 64, 65, 66 and 67 serially connected between a power source voltage $V_{DD}$ and ground $V_{SS}$ and having gate electrodes for inputting carry generating signals $g_i$, $g_{i-1}$, $g_{i-2}$, and $g_{i-3}$; an NMOS transistor 71 having a gate electrode connected to the gate electrode of PMOS transistor 60, a drain electrode connected to the drain electrode of PMOS transistor 63, and a source electrode connected to ground; an NMOS transistor 72 having a gate electrode connected to the gate electrode of NMOS transistor 61, a drain electrode connected to the drain electrode of PMOS transistor 63 and a source electrode connected to the drain electrode of NMOS transistor 66; an NMOS transistor 73 having a gate electrode connected to the gate electrode of PMOS transistor 61, a drain electrode connected to the drain electrode of PMOS transistor 63, a source electrode connected to and the drain electrode of NMOS transistor 65; a PMOS transistor 68 having a gate electrode for inputting carry propagating signal pj, a source electrode connected to the drain electrode of PMOS transistor 60, and a drain electrode connected to the drain electrode of PMOS transistor 63; a PMOS transistor 69 having a gate electrode for inputting carry propagating signal $p_{i-1}$, a source electrode connected to the drain electrode of PMOS transistor 61, and a drain electrode connected to the drain electrode of PMOS transistor 63; a PMOS transistor 70 having a gate electrode for inputting carry propagating signal $p_{i-2}$, a source electrode connected to the drain electrode of PMOS transistor 62, and a drain electrode connected to the drain electrode of PMOS transistor 63; and an NMOS transistor 64 having a gate electrode connected to the gate electrode of PMOS transistor 63 a drain electrod connected to the drain of PMOS transistor 63 and a source electrode connected to the source electrode of NMOS transistor 65. The output of the third cell circuit is taken from the drain of PMOS transistor 63 and inverted by inverter 74.

FIG. 5F illustrates the circuit of the sum block according to the present invention.

In FIG. 5F, the sum block circuit includes an inverter 75 for inverting carry propagating signal pj, an NMOS transistor 76 for propagating the output signal of inverter 75 in response to output signal $C_{i-1}$ of the carry evaluation block; a PMOS transistor 78 for propagating carry propagating signal $p_i$ in response to output signal $C_{i-1}$, and a CMOS transmission gate 79 for propagating output signal $C_{i-1}$ in response to the output signal of inverter 75 S and carry propagating signal $p_i$.

Figure 6:
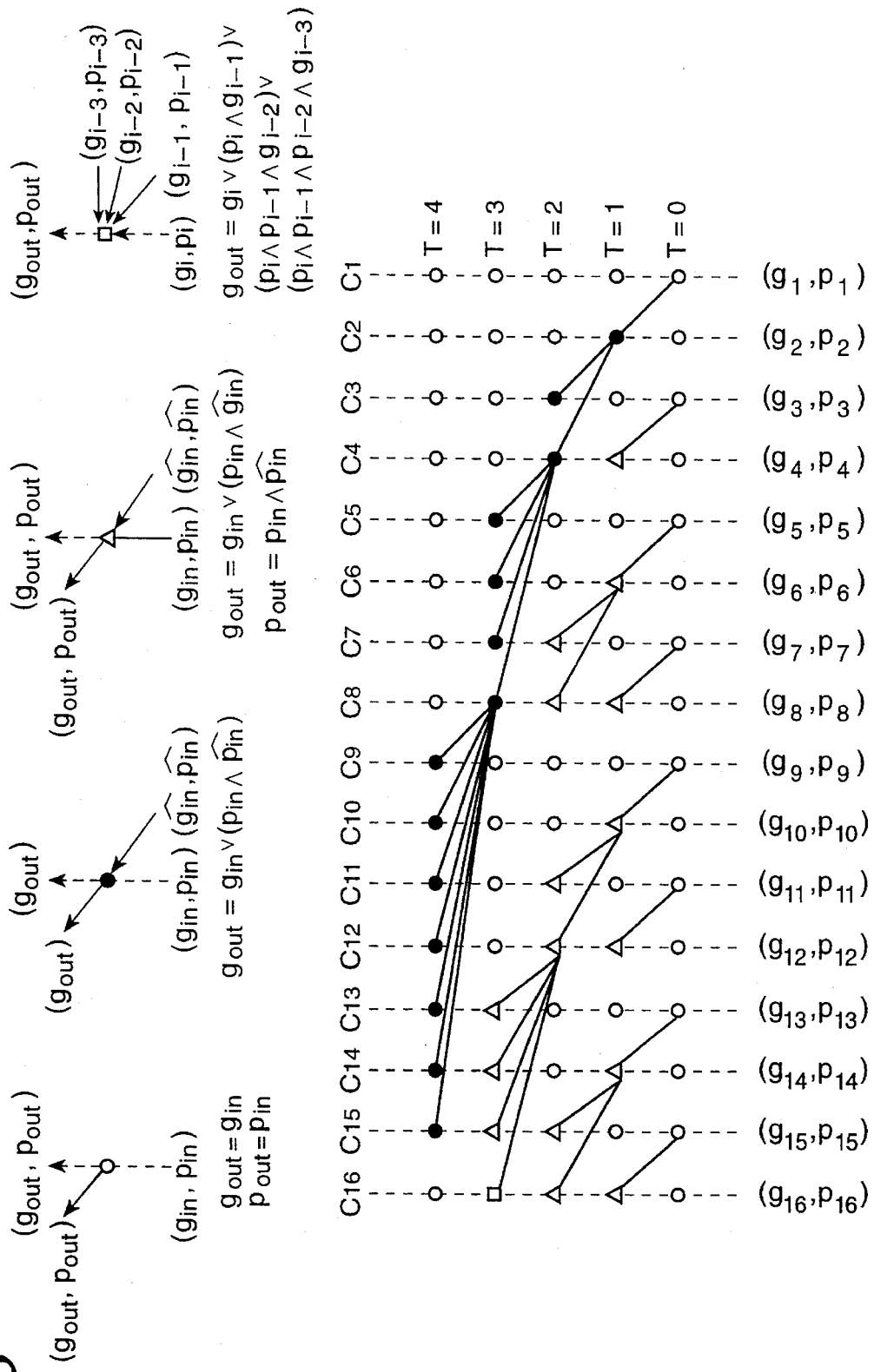
FIG. 6 shows tree structures of the carry evaluation block according to the present invention.

FIG. 6 illustrates tree structures of the carry evaluation block according to the present invention for a 16 bit adder.

In FIG. 6, a small circle receives carry generating & propagating signal (gin, pin), thereby executing:

$$gout = gin$$

$$pout = pin \quad (3)$$

A solid dot receives carry generating & propagating signals ($gin_1$, $pin_1$) and ($gin_2$, $pin_2$), thereby executing:

$$gout = gin_1 V(pin_1 \wedge pin_2) \quad (4)$$

A triangular mark receives carry generating & propagating signals (gin1,pin1) and (gin2, pin2), thereby executing:
$$gout = gin1 V(pin1 \wedge gin2)$$

$$pout = pin_1 \wedge pin_2 \quad (5)$$

A rectangular mark receives carrying generating & propagating signals ($g_i$,$p_i$), ($g_{i-1}$, $p_{i-1}$), ($g_{i-2}$, $p_{i-2}$) and ($g_{i-3}$, $p_{i-3}$), thereby executing:

$$gout = g_i V(p_i \wedge g_{i-1}) V(p_i \wedge p_{i-1} \wedge p_{i-2}) V(p_i \wedge p_{i-1} \wedge p_{i-2} \wedge g_{i-3}.) \quad (6)$$

In a first stage (T=0), carry generating & propagating signal (gi, pi where i=1, 2, 3 ..., 16) is input to thus perform the operation of equation (3).

In a second stage (T=1), the output signals of first stage (T=0) are input by twos, so that the operation of equation (4) is performed to the first two output signals, the operation of equation (5) is performed to respective pairs of the remaining output signals, and the operation of equation (3) is performed to the odd output signals (gi, pj where i=1, 3, 5 ..., 15) of the first stage.

In a third stage (T=2), the operation of equation (3) is performed to the 1st & 2nd, 5th & 6th, 9th & 10th, and 13th & 14th output signals of the second stage; the operation of equation (4) is performed by respectively inputting the 2nd & 3rd and 2nd & 4th output signals; and the operation of equation (5) is performed by respectively inputting the 6th & 7th, sixth & 8th, 10th & 11th, 10th & 12th, 14th & 15th and 14th & 16th output signals.

In a fourth stage (T=3), the operation of equation (3) is performed to the 1st, 2nd, 3rd, 4th and 9th to 12th output signals of the third stage; the operation of equation (4) is performed by respectively inputting the 4th & 5th, 4th & 6th, 4th & 7th and 4th & 8th output signals; the operation of equation (5) is performed by respectively inputting the 12th & 13th, 12th & 14th and 10th & 15th output signals; and the operation of equation (6) is performed by inputting the 12th & 16th output signals.

In a fifth stage (T=4), the operation of equation (3) is performed to the 1st through 8th and 16th output signals of the fourth stage (T=3), and the operation of equation (4) is performed by respectively inputting to the 8th & 9th, 10th & 11th, 12th & 13th and 14th & 15th output signals. Therefore, a final carry signal $C_i$ (where i=1, 2, 3 ..., 16) is output.

Figure 7:
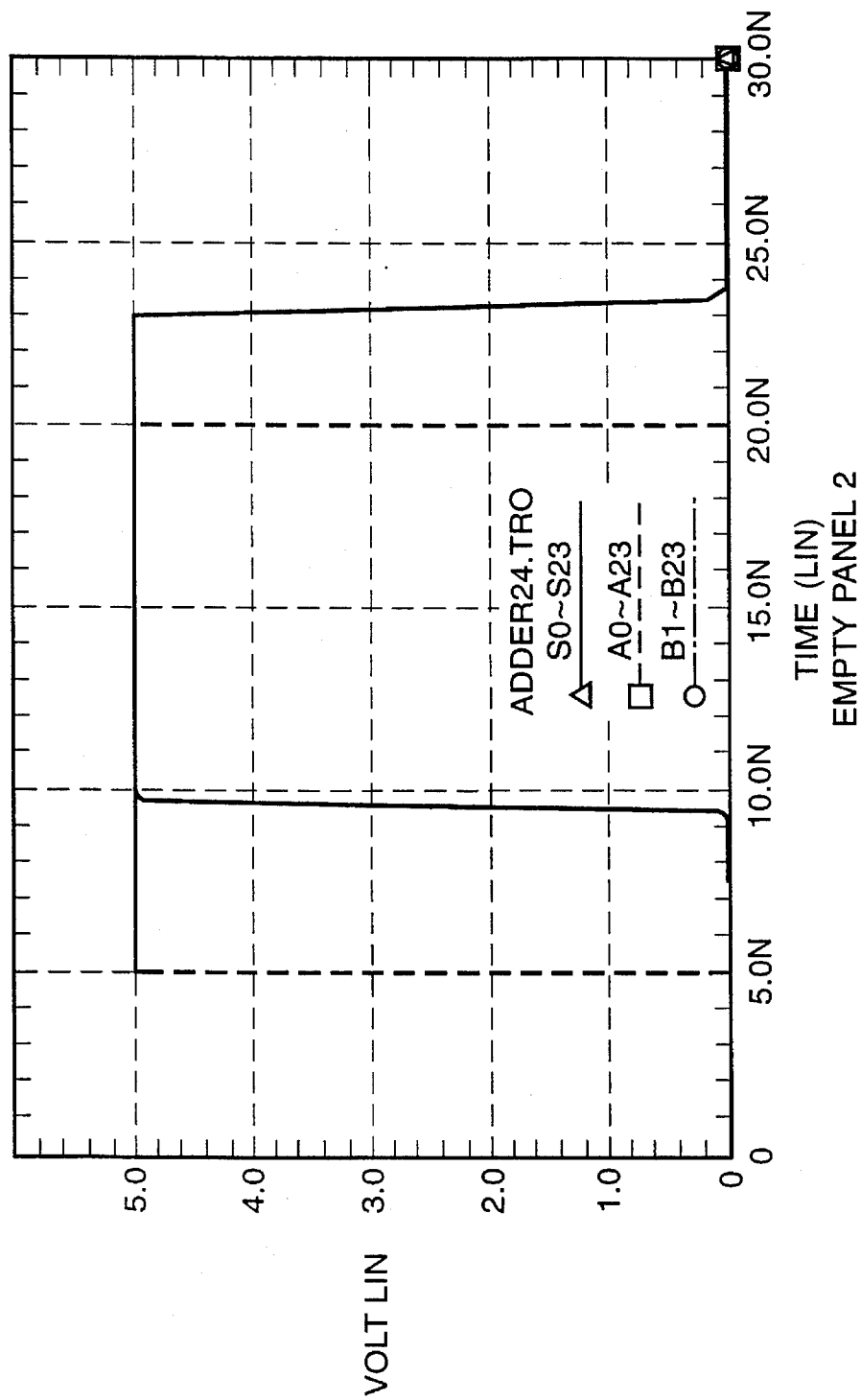
FIG. 7 is a graph obtained by simulating the operation of the adder according to the present invention.

FIG. 7 illustrates a result of an actual simulation of the 24-bit adder according to the present invention and described with reference to FIG. 4.

As can be shown in FIG. 7, the speed of addition is improved as compared with that of the conventional circuit. Using this characteristic, the tree structure of the carry evaluation block is obtained. In the tree structure, a multi-operand is a function for calculating new block carry generating signal $G_i$ and block carry propagating signal $P_i'$ from the two pairs of $G_i$ and $P_i$.

According to the present invention, block carry generating signal $G_i$, block carry propagating signal Pi and final carry signal $C_i$ can be calculated by only four stages when n=16, which denotes that the propagation delay is halved as compared with that of the conventional technique.

Also, since the block carry generating signal $G_i$ is the same as final carry signal $C_i$ in the sum block, final sum $S_i$ can be obtained by carrying an exclusive-OR operation of $P_i$ and $C_{i-1}$.

Moreover, when n=16, the arithmetic structure shown in FIG. 4 can be extended to increase by stages whenever the number of bits is increased by integer multiples thereby forming an adder whose propagation delay is significantly decreased as compared with the adder formed by the conventional technique.

Even though a 16-bit tree structure is shown in the above-described embodiment, the tree structure is increased when increasing the number of bits by sixteen. That is, when the number of bits is increased to thirty-two, two tree structures are required and the level of the tree is increased by one.

While the invention has been described in connection with what is presently considered to be the most practical and preferred embodiments, it is understood that the invention is not limited to the disclosed embodiment, but, on the contrary, is intended to cover various modifications and equivalent arrangements included within the spirit and scope of the appended claims.

What is claimed is:

1. An adder comprising:

carry generation & propagation circuits for inputting two 16-bit data signals to output carry generating & propagating signals;

1st-first cells for respectively inputting 3rd & 4th, 5th & 6th, 7th & 8th, 9th & 10th, 11th & 12th, 13th & 14th and 15th & 16th output signals from said carry generation & propagation circuits to perform an operation;

a 1st-second cell for inputting 1st and 2nd output signals of said carry generation & propagation circuits to perform an operation;

2nd-second cells for respectively inputting an output signal of said 1st-second cell, a 3rd output signal of said carry generation & propagation circuits, and a 1st output signal of said 1st-first cells to perform operations;

2nd-first cells for respectively inputting a 2nd output signal of said 1st-first cells, a 7th output signal of said carry generation & propagation circuits and a 3rd output signals of said 1st-first cells, respectively inputting a 4th output signal of said 1st-first cells, an 11th output signal of said carry generation & propagation circuits and a 5th output signal of said 1st-first cells, and respectively inputting a 6th output signal of said 1st-first cells, a 15th output signal of said carry generation & propagation circuits and a 7th output signal of said 1st-first cells, to perform respective operations;

3rd-first cells for respectively inputting a 2nd output signal of said 2nd-second cells, a 5th output signal of said carry generation & propagation circuits, a 2nd output signal of said 1st-first cells, 1st & 2nd output signals of said 2nd-first cells, and respectively inputting a 4th output signal of said 2nd-first cells, a 13th output signal of said carry generation & propagation circuits, a 6th output signal of said 1st-first cells and a 5th output signal of said 2nd-first cells, to perform respective operations;

3rd-second cells for respectively inputting a 2nd output signal of said 2nd-second cells, a 5th output signal of said carry generation & propagation circuits, a 2nd output signal of said 1st-first cells, and a 1st output signal of said 2nd-first cells, to perform an operation;

a third cell for inputting 1st, 2nd, 4th and 6th output signals of said 2nd-first cells and a 2nd output signal of said 2nd-second cells, to perform an operation;

4th-second cells for respectively inputting a 4th output signal of said 3rd-second cells, a 9th output signal of said carry generation & propagation circuits, a 4th output signal of said 1st-first cells, 3rd and 4th output signals of said 2nd-first cells, and 1st, 2nd and 3rd output signals of said 3rd-first cells; and final sum circuits for respectively inputting said output signals from said carry generation & propagation circuits and first, second and third cells to output a final sum.

2. An adder as claimed in claim 1, wherein the carry generation circuit comprises:

a first inverter for inverting a second input signal;

a first CMOS transmission gate for propagating a first input signal in response to said second input signal and an inverted second input signal; and a first NMOS transmission gate for propagating said second input signal in response to said inverted second input signal.

3. An adder as claimed in claim 2, wherein the carry propagation circuit comprises:

a second inverter for inverting said second input signal;

a second CMOS transmission gate for propagating said first input signal in response to said second input signal and said inverted second input signal;

a second NMOS transmission gate for propagating said inverted second input signal in response to said first input signal; and a first PMOS transmission gate for propagating said second input signal in response to said first input signal.

4. An adder as claimed in claim 1, wherein said first cell comprises:

a first AND gate for performing a logical product of a carry propagating signal and a carry generating signal of lower-order bits;

a first OR gate for performing a logical sum of said carry generating signal and an output signal of said first AND gate; and a second AND gate for performing a logical product of said carry propagating signal and said carry generating signal of lower-order bits.

5. An adder as claimed in claim 3, wherein said third cell comprises:

four second PMOS transistors for inputting first, second, third and fourth carry generating signal to respective gate electrode, and four second NMOS transistors being serially connected between a power source voltage and ground;

a third NMOS transistor having a gate electrode connected to a gate electrode of the 1st-second PMOS transistor, a drain electrode connected to a 10 drain electrode of the 1st-fourth PMOS transistor, and a source electrode connected to ground;

a fourth NMOS transistor having a source electrode connected to both a drain electrode of said 1st-fourth PMOS transistor and a source electrode of said 3rd-second NMOS transistor;

a fifth NMOS transistor having a drain electrode connected to both a drain electrode of said 4th-second PMOS transistor and a drain electrode connected to said 2nd-second NMOS transistor;

a third PMOS transistor having a gate electrode for inputting a first carry propagating signal, a source electrode connected to a drain electrode of said 1st-second PMOS transistor, and a drain electrode connected to a drain electrode of said 4th-second PMOS transistor;

a fourth PMOS transistor having a gate electrode for inputting a second carry propagating signal, a source electrode connected to a drain electrode of said 2nd-second PMOS transistor, and a drain electrode connected to a drain electrode of said 4th-second PMOS transistor;

a fifth PMOS transistor having a gate electrode for inputting a third carry propagating signal, a source electrode connected to a drain electrode of said 3rd-second PMOS transistor, and a drain electrode connected to a drain electrode of said 4th-second PMOS transistor; and a 1st-second NMOS transistor having a gate electrode connected to a gate electrode of said 4th-second PMOS transistor.

6. An adder as claimed in claim 5, wherein said sum circuit comprises:

a third inverter for inverting said carry propagating signal;

a sixth NMOS transistor for propagating an output signal of said third inverter in response to an output signal of said carry evaluation block;

a sixth PMOS transistor for propagating said carry propagating signal in response to the output signal of said carry evaluation block; and a third CMOS transmission gate for propagating an output signal of said carry evaluation block in response to said output signal of said third inverter and said carry propagating signal.

7. An adder as claimed in claim 1, wherein the same structure is repeatedly added and an addition level is increased one by one whenever the number of bits is increased by sixteen.

* * * * *